US012627699B2

(12) United States Patent
Barai

(10) Patent No.: US 12,627,699 B2
(45) Date of Patent: May 12, 2026

(54) NETWORK SECURITY ASSESSMENT BASED UPON IDENTIFICATION OF AN ADVERSARY

(71) Applicant: International Business Machines Corporation, Armonk, NY (US)

(72) Inventor: Dineshkumar Ramnath Barai, Navi Mumbai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 18/206,168

(22) Filed: Jun. 6, 2023

(65) Prior Publication Data

US 2024/0414184 A1 Dec. 12, 2024

(51) Int. Cl.
*H04L 9/40* (2022.01)
*G06F 16/9538* (2019.01)

(52) U.S. Cl.
CPC ...... *H04L 63/1433* (2013.01); *G06F 16/9538* (2019.01); *H04L 63/1416* (2013.01); *H04L 63/1425* (2013.01); *H04L 63/1441* (2013.01)

(58) Field of Classification Search
CPC ............. H04L 63/1433; H04L 63/1416; H04L 63/1425; H04L 63/1441; G06F 16/9538
See application file for complete search history.

(56) References Cited

U.S. PATENT DOCUMENTS 7,624,447 B1 * 11/2009 Horowitz ............ H04L 63/0263
726/23

9,413,774 B1 * 8/2016 Liu ........................ G06F 21/566
(Continued)

FOREIGN PATENT DOCUMENTS

CN 117321966 A * 12/2023 ........... G06F 21/554
EP 2955895 B1 * 10/2019 ......... H04L 63/1408
(Continued)

OTHER PUBLICATIONS

Roe, Using Mitre Att&CK with threat intelligence to improve Vulnerability Management, Nov. 29, 2021, https://outpost24.com/blog/Using-mitre-attack-with-threat-intelligence-to-improve-vulnerability-management.
(Continued)

*Primary Examiner* — Sarah Su
(74) *Attorney, Agent, or Firm* — Garg Law Firm, PLLC; Rakesh Garg; Anthony Mauricio Pallone

(57) ABSTRACT

A computer-implemented method comprises establishing a database based at least in part on network traffic data received from a network, detecting adversarial behavior within the network traffic data, identifying an adversary associated with the adversarial behavior, determining a plurality of specific indicators of compromise that are associated with the adversary that has been identified, constructing a query based on the plurality of specific indicators of compromise, submitting the query to search for the plurality of specific indicators of compromise within the network traffic data, searching for the plurality of specific indicators of compromise within the network traffic data, and generating, responsive to having located at least one potential indicator of compromise, a search report containing at least one specific indicator of compromise and displaying the search report to a user interface.

20 Claims, 7 Drawing Sheets

(56) References Cited

U.S. PATENT DOCUMENTS

| | | | | |
|---|---|---|---|---|
| 9,560,072 | B1 * | 1/2017 | Xu | H04L 63/1441 |
| 10,785,238 | B2 * | 9/2020 | McLean | H04L 63/1416 |
| 11,082,434 | B2 | 8/2021 | Ravindra et al. | |
| 11,134,090 | B1 * | 9/2021 | Swackhamer | H04L 63/145 |
| 11,290,483 | B1 * | 3/2022 | Kannan | H04L 63/1433 |
| 2018/0004942 | A1 * | 1/2018 | Martin | G06F 21/554 |
| 2018/0307833 | A1 * | 10/2018 | Noeth | H04L 63/20 |
| 2019/0028490 | A1 * | 1/2019 | Chen | H04L 63/1416 |
| 2020/0314141 | A1 * | 10/2020 | Vajipayajula | H04L 63/145 |
| 2020/0344251 | A1 * | 10/2020 | Jeyakumar | H04L 51/212 |
| 2020/0366689 | A1 * | 11/2020 | Lotia | H04L 63/1483 |
| 2021/0011967 | A1 * | 1/2021 | Rathod | G06F 16/9535 |
| 2021/0336977 | A1 * | 10/2021 | Udupi Raghavendra | |
| | | | | H04L 43/028 |
| 2021/0400063 | A1 * | 12/2021 | Tackabury | H04L 63/1425 |
| 2022/0060491 | A1 * | 2/2022 | Achleitner | H04L 63/1425 |
| 2022/0086178 | A1 * | 3/2022 | Jayamohan | G06F 9/45558 |
| 2022/0201019 | A1 | 6/2022 | Navarro | |
| 2023/0113375 | A1 | 4/2023 | Thomas et al. | |
| 2024/0289447 | A1 * | 8/2024 | Blessing | G06F 21/577 |
| 2024/0396871 | A1 * | 11/2024 | Moore | H04L 63/0236 |
| 2025/0023887 | A1 * | 1/2025 | Bosch | H04L 63/1416 |

FOREIGN PATENT DOCUMENTS

| | | | | |
|---|---|---|---|---|
| WO | WO-2019147384 A1 * | 8/2019 | | G06F 21/564 |
| WO | WO-2020014687 A1 * | 1/2020 | | H04L 47/24 |
| WO | WO-2022225951 A1 * | 10/2022 | | G06F 21/554 |

OTHER PUBLICATIONS

Maltego, IBM QRadar Transforms for Maltego, 2023, https://www.maltego.com/transform-hub/ibm-qradar/.

IBM, The IBM QRadar Security Intelligence Platform, Jan. 2019.

IBM, Visualizing MITRE tactics and techniques that are detected in a specific timeframe, Apr. 4, 2023, https://www.ibm.com/docs/en/qradar-common?topic=mamv-visualizing-mitre-tactics-techniques-that-are-detected-in-specific-timeframe.

Choi et al., Probabilistic Attack Sequence Generation and Execution Based on MITRE ATT&CK for ICS Datasets, CSET '21, Aug. 9, 2021.

IBM, QRadar Use Case Manager—QRadar 7.3.3 FP6+/7.4.1 FP2+, 2023, https://exchange.xforce.ibmcloud.com/hub/extension/511b125b505e515f4da5c553a7504b55.

IBM, IBM Security QRadar Analyst Workflow—QRadar 7.4.3 FP1+ only, 2023, https://exchange.xforce.ibmcloud.com/hub/extension/ec3471adfdbb0b7bb3fbcf60f0ba5837.

IBM, QRadar Advisor With Watson—v7.5.0+, 2023, https://exchange.xforce.ibmcloud.com/hub/extension/7f9a33b3090e223aaa56868d961f0fc3.

IBM, Threat Intelligence—QRadar 7.4.2 FP3+, 2023, https://exchange.xforce.ibmcloud.com/hub/extension/01d113730a63f5117a7e1f4c85850127.

* cited by examiner

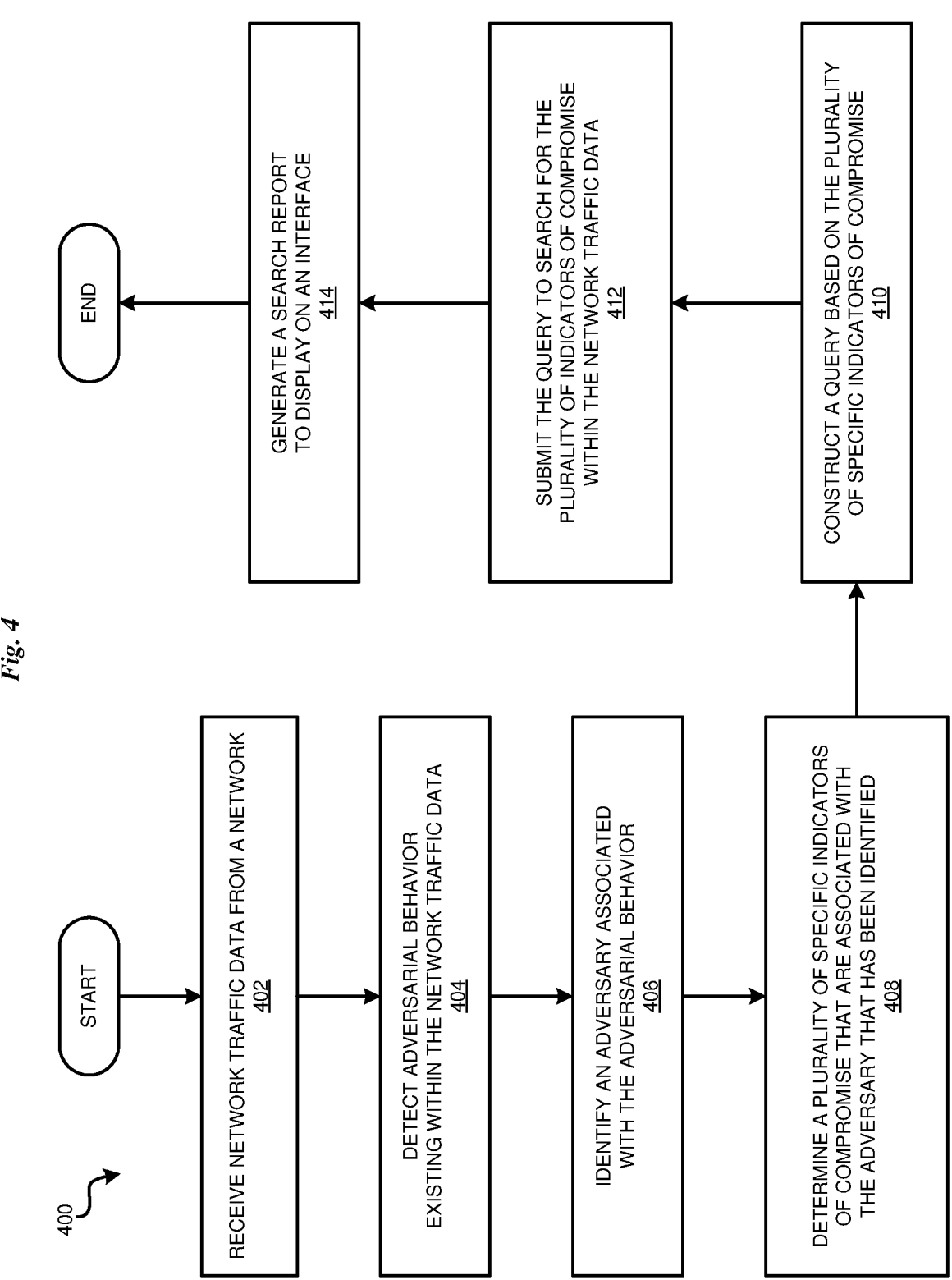

400

START

RECEIVE NETWORK TRAFFIC DATA FROM A NETWORK
402

DETECT ADVERSARIAL BEHAVIOR EXISTING WITHIN THE NETWORK TRAFFIC DATA
404

IDENTIFY AN ADVERSARY ASSOCIATED WITH THE ADVERSARIAL BEHAVIOR
406

DETERMINE A PLURALITY OF SPECIFIC INDICATORS OF COMPROMISE THAT ARE ASSOCIATED WITH THE ADVERSARY THAT HAS BEEN IDENTIFIED
408

CONSTRUCT A QUERY BASED ON THE PLURALITY OF SPECIFIC INDICATORS OF COMPROMISE
410

SUBMIT THE QUERY TO SEARCH FOR THE PLURALITY OF INDICATORS OF COMPROMISE WITHIN THE NETWORK TRAFFIC DATA
412

GENERATE A SEARCH REPORT TO DISPLAY ON AN INTERFACE
414

END

NETWORK SECURITY ASSESSMENT BASED UPON IDENTIFICATION OF AN ADVERSARY

BACKGROUND

The present invention relates generally to network security. More particularly, the present invention relates to a method, system, and computer program for network security assessment based upon identification of an adversary.

Computer security (also known as "network security" and "cyber security") refers to the protection of computer systems and networks from attack by malicious actors that may result in unauthorized information disclosure, theft of, or damage to hardware, software, or data, as well as from the disruption or misdirection of the services they provide.

Protecting computer systems and networks from attack by malicious actors includes thorough monitoring and assessment of the behavior of users across those computer systems and networks. Often, the actions taken by the malicious actors are perpetrated by known groups e.g., threat groups that follow routine or known methods of performing malicious actions. When cyber-attacks occur, malicious actors often leave behind artifacts that may provide an indication that a computer system or network has been compromised.

Currently, there exist a number of different organizations that track and monitor the activities of these groups so that users and owners of computer systems and networks may be better equipped to safeguard against cyber-attacks. Further, these organizations compile and publish publicly available knowledge bases containing information relating to the groups and the methods they employ to perpetrate cyber-attacks.

Embodiments of the present invention have been conceived in light of the above.

SUMMARY

The illustrative embodiments provide for network security assessment based upon an identified adversary.

An embodiment includes a computer-implemented method comprising establishing a database based at least in part on network traffic data received from a network, wherein the database comprises network traffic data representative of a plurality of entities in the network and relationships among the plurality of entities in the network, detecting adversarial behavior within the network traffic data, identifying an adversary associated with the adversarial behavior, determining a plurality of specific indicators of compromise that are associated with the adversary that has been identified, constructing a query based on the plurality of specific indicators of compromise, submitting the query to search for the plurality of specific indicators of compromise within the network traffic data, searching for the plurality of specific indicators of compromise within the network traffic data, and generating, responsive to having located at least one potential indicator of compromise, a search report containing at least one specific indicator of compromise and displaying the search report to a user interface.

An embodiment includes a computer system. The computer system includes a processor, a computer-readable memory, and a computer-readable storage medium, and program instructions stored on the storage medium for execution by the processor via the memory.

An embodiment includes a computer usable program product. The computer usable program product includes a computer-readable storage medium, and program instructions stored on the storage medium.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 2 depicts a block diagram of an example network infrastructure in accordance with an illustrative embodiment;

FIG. 4 depicts a flowchart of an example process for network security assessment based upon identification of an adversary.

DETAILED DESCRIPTION

Figure 1:
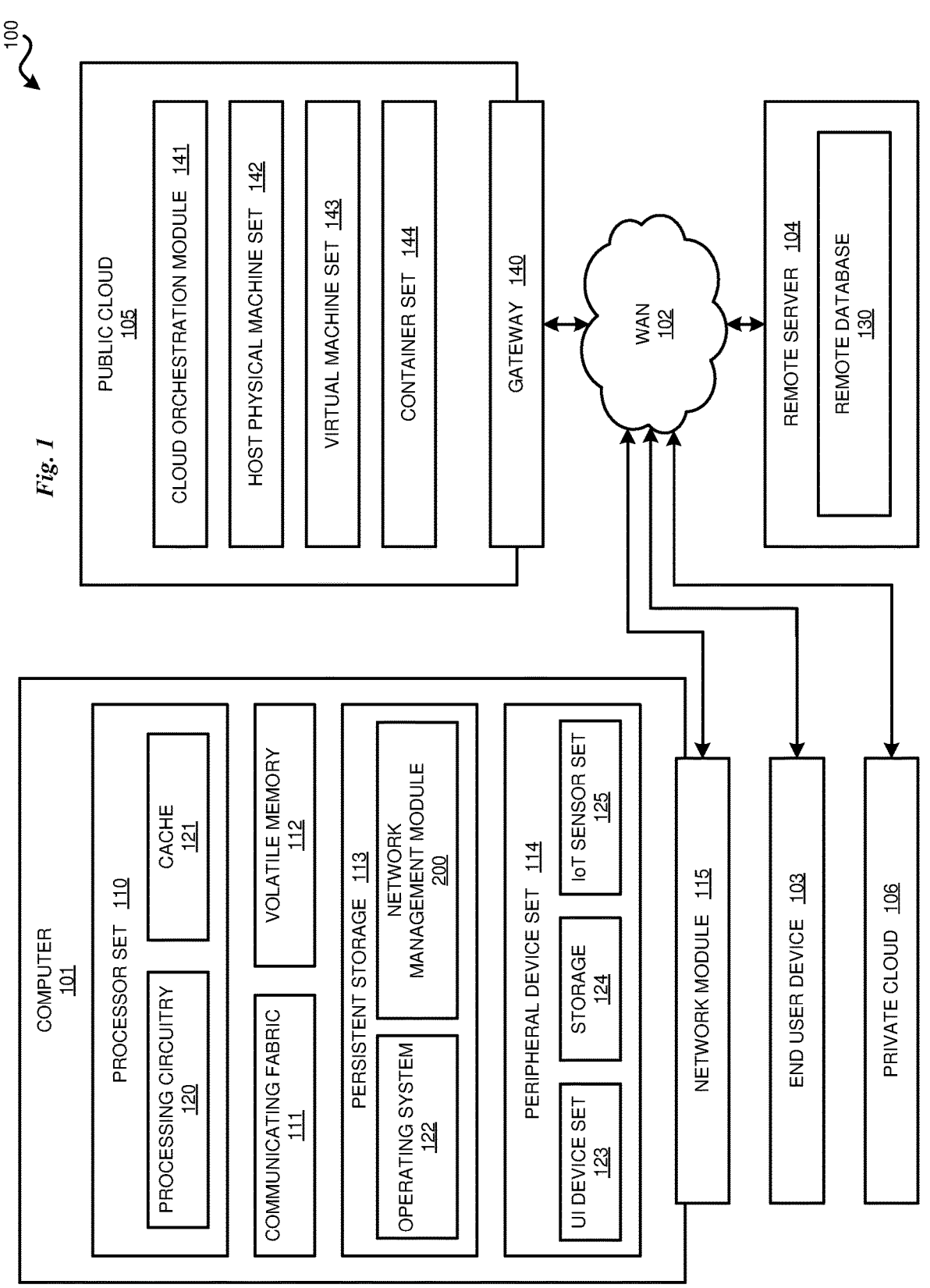
FIG. 1 depicts a block diagram of a computing environment in accordance with an illustrative embodiment.

The illustrative embodiments recognize that there is a need to precisely and efficiently assess the security of a computer system or network, especially when a potential security compromise has been detected or suspected. For example, computer systems and networks often store all types of sensitive and/or confidential information that is at risk of being leaked when a system or network is compromised. As another example, computer systems and networks are at risk of being denied the ability of providing services when said system or network is compromised. The leaking of private data as well as the interruption of specific services may lead to catastrophic consequences if not properly protected against or mitigated in the event that a security compromise has occurred.

In addition, many presently-available Security Information and Event Management (SIEM) systems do not adequately identify a specific adversary that may have compromised the computer system or network, nor perform assessment of the computer system or network that is specifically based on the adversary that has been identified. Current SIEM systems may have to search for thousands of different Indicators of Compromise (IOCs) across a computer system and/or network, which may be imprecise and inefficient. It is contemplated that permanent harm may be caused to a computer system or network in the time a presently available SIEM may take to discover the attack. Further, searching for thousands of different IOCS may cause unnecessary drain of computer resources. Existing solutions, such as for example, SIEM, Network Detection and Response (NDR), and/or Endpoint Detection and Response (EDR) systems, may use rules, baselines, and/or anomaly of behavior based detection procedures to assess network security. However, there are currently no procedures that include identifying threat groups based on tactics and techniques from MITRE® Adversarial Tactics, Technique, and Common Knowledge (ATT&CK®) framework, and subsequently scanning for IOCs associated with the identified threat groups. (MITRE®, ATT&CK®, and ATT&CK®-related terms are trademarks owned by The Mitre Corporation in the United States and other jurisdictions.)

The illustrative embodiments recognize that the presently available tools or solutions do not address these needs or provide adequate solutions for these needs. The illustrative embodiments used to describe the invention generally address and solve the above-described problems and other problems related to precisely and efficiently assessing the security of a computer system and/or network.

An embodiment can be implemented as a software application. The application implementing an embodiment can be configured as a modification of an SIEM system, as a separate application that operates in conjunction with an existing SIEM system, a standalone application, or some combination thereof.

Particularly, some illustrative embodiments provide a method that identifies a potential adversary based on detected behavior over a computer system and/or network, and assesses the security of the computer system and/or network in party by searching for IOCs that are associated with the potential adversary that has been identified.

When cyber-attacks occur, adversaries often leave behind artifacts that may provide an indication that an attack has occurred and/or that the computer system and/or network has been compromised. However, since there are thousands of different possible artifacts that may be left behind to indicate that an attack has occurred and/or that network security has been comprised, it may be imprecise and inefficient to search for all possible artifacts that may exist to indicate whether an attack has occurred and/or whether a computer system and/or network has been compromised. There is a need for a precise and efficient method to assess network security, both in terms of time and computer resource utilization.

The present disclosure addresses the deficiencies described above by providing a process (as well as a system, method, machine-readable medium, etc.) that identifies threat groups based on detected tactics and techniques and subsequently performs a network security assessment by searching for specific Indicators of Compromise associated with the threat groups that have been identified.

The illustrative embodiments provide a process for network security assessment based upon identification of an adversary. An adversary as referred to herein is a term used to describe a malicious actor or group of actors that are attempting to gain unauthorized access to a computer system or network. Malicious actions may be used to steal data, disrupt services, or even cause physical damage to a system. Embodiments disclosed herein describe the network as computer network; however, use of this example is not intended to be limiting, but is instead used for descriptive purposes only.

A malicious action (and malicious activities) as referred to herein may or may not include an action that does any physical and/or tangible harm to a computer system and/or network. For example, a malicious action may include corrupting data on a database. A malicious action may also include simply gaining unauthorized access to a database. It is to be understood that the terms "malicious action" and "attack" may be used interchangeably.

As used throughout the present disclosure, the term "threat group" refers to an individual or entity that conducts malicious activities, typically with the objective of compromising the security of computer systems, networks, and/or data. Threat groups may include a threat group that is publicly known, as well as threat groups that might not be publicly known. Information related to threat groups, and actions and behaviors associated with threat groups, may be compiled and disclosed on publicly accessible knowledge bases.

As used throughout the present disclosure, the term "tactic(s)" describes the high-level goals and objectives of an adversary. Accordingly, tactics represent the overarching strategies employed to achieve an adversary's malicious intent. Examples of tactics may include, but are not limited to, gaining unauthorized access, privilege escalation, data exfiltration, denial of service, and/or spreading malware.

As used throughout the present disclosure, the term "technique(s)" refers to the specific methods and tools utilized by an adversary to accomplish certain goals and objectives within the selected tactics. Techniques include lower-level details about the steps and actions that may be taken by an adversary. Examples of techniques may include, but are not limited to, exploiting a software vulnerability, conducting phishing attacks, brute-forcing passwords, and/or using social engineering techniques.

As used throughout the present disclosure, the term "procedure(s)" refers to the detailed step-by-step process followed by an adversary to execute the adversary's techniques. Procedures include the specific sequence of actions taken by an adversary to achieve the adversary's goals. Examples of procedures may include, but are not limited to, specific commands, scripts, or tools used during the attack.

As used throughout the present disclosure, the term "Indicator(s) of compromise" or "IOC(s)" may refer to artifacts or evidence that indicate the presence or occurrence of a cybersecurity incident or compromise. An IOC may typically be generated through, for example, the analysis of security events, logs, network traffic, forensic investigations, etc. IOCs may be indicators of a potential security breach, suspicious activities, or malicious actions in a computer system or network. While some IOCs have been disclosed within this disclosure, it is understood that other IOCs may exist that would be readily known by those having skill in the art in the relevant field pertaining to this disclosure, and such IOCs, although not explicitly listed, are nevertheless included and considered within the scope of the present disclosure.

File-based IOCs refer to indicators related to specific files or binaries associated with malicious activities. File-based IOCs may include, but are not limited to, file hashes, filenames, file paths, or digital signatures that identify known malicious files or variants.

Network-based IOCs refer to indicators related to network-based activities associated with malicious activities. Network-based IOCs may include, but are not limited to, IP addresses, domain names, URLs, ports, command-and-control servers, or other malicious infrastructure. Network-based IOCs may also include, but are not limited to, patterns of network traffic, protocols, or specific network behaviors that are indicative of compromise.

Host-based IOCs refer to specific compromised systems or hosts. Host-based IOCs may include, but are not limited to, suspicious or modified system files, registry keys, abnormal system behavior, unexpected processes, or anomalous log entries.

Behavioral IOCs refer to indicators that relate to abnormal or suspicious behaviors exhibited by users, applications, or systems. Behavioral IOCs may include, but are not limited to, patterns such as repeated failed login attempts, unusual user account activity, privilege escalation attempts, or abnormal data transfer volumes.

As used throughout the present disclosure, the terms "flow(s)" and "flow data" refer to representations of unidirectional sequence of packets that share common attributes, including, but not limited to, source and destination IP addresses, source and destination ports, protocol type, and timestamps. Flows may provide a high-level view of network traffic and may typically generated by network devices, including but not limited to, routers, switches, firewalls, etc. and may accordingly employ flow monitoring protocols. Further, flow data can provide insights into network behavior, traffic patterns, and communication between hosts.

As used throughout the present disclosure, the terms "event(s)" and "event data" refers to discrete occurrences or incidents that may be captured in log files generated by various devices, systems, or security tools within a network infrastructure. Examples of events may include, but are not limited to, security-related events, system events, application events, authentication events, etc. Further, each event entry may contain specific information about the event, including but not limited to, timestamps, event type, source IP address, target IP address, user ID, event description, and relevant metadata.

Security Information and Event Management (SIEM) systems refer to systems that are configured to collect, correlate, and analyze event and flow data from multiple sources to identify security incidents, detect patterns, and/or generate additional responses. Accordingly, events and flows may provide a detailed and chronological record of activities across a computer system and/or network.

IBM® QRadar® is a nonlimiting example of a Security Information and Event Management (SIEM) system contemplated herein, that enables detection, monitoring, and analysis of cybersecurity threats and incidents. QRadar® may collect and correlate log data, event data, and flow data from multiple sources within a network infrastructure, including, but not limited to, network devices, servers, operating systems, applications, security devices, etc. (IBM®, QRadar®, and QRadar-related terms are trademarks owned by International Business Machines Corporation in the United States and other jurisdictions.) Further, QRadar® provides multiple Application Programming Interfaces (APIs) that enable integration with other external security tools, applications, systems, applications, and services. QRadar® APIs include, but are not limited to, QRadar® Offense API, QRadar® Use-Case Manager API, and QRadar® Ariel Query API.

Rules in QRadar® refer to a collection of tests that triggers an action when specific conditions are met. Each rule can be configured to capture and respond to a specific event, sequence of events, flow sequence, or offense. Some actions that can be triggered include, but are not limited to, sending an email or generating a syslog message. Rules in QRadar® may include both predefined and custom-defined logical expressions that define specific conditions or patterns to identify security events of interest. These rules may be used to detect and categorize potential security incidents or policy violations within a network infrastructure.

Further, rules may include both triggers and responses. Triggers may define the event conditions or patterns that need to be matched for a rule to be activated. Triggers can be based on various attributes, including but not limited to, event source, destination, specific fields within the event payload, or the occurrence of a specific sequence of events.

Responses may specify the actions to be taken when a rule is triggered. Responses may include, but are not limited to, generating an offense, sending notifications or alerts, invoking scripts or external systems, or initiating other types of automated responses.

Offenses in QRadar® refer security incidents or suspicious events that have been detected and categorized based on the defined rules and correlation logic. When an event or a set of events matches the conditions specified in a rule, an offense is generated to represent a potential security incident. Offenses in QRadar® may contain important information, including but not limited to, the severity level, source and destination IP addresses, associated events, rule ID, and a description of the potential threat or policy violation. While rules define the conditions for detecting security events, offenses represent the detected security incidents or suspicious events categorized based on those rules. Accordingly, event and flow data may be correlated against the rules that are configured and an offense can be generated based on such correlation.

IBM® X-Force® Exchange is a nonlimiting example of a knowledge base and collaborative threat intelligence platform contemplated herein that enables sharing information, including, but not limited to, security intelligence and threat data. Further, X-Force® Exchange includes case files (known as "collections") documenting adversaries and threat groups and the Indicators of Compromise (IOCs) associated with such adversaries and threat groups. Further, X-Force® Exchange includes APIs that enable the platform to integrate with others external security tools, applications, systems, and services.

An illustrative embodiment includes a process for identifying at least one adversary e.g., threat group based on behaviors, e.g., tactics and techniques over a computer system and/or network. The illustrative embodiment may further include a process for performing a network security assessment at least in part by searching for IOCs corresponding to the threat group that has been identified. Accordingly, the illustrative embodiment may include a multi-stage process for assessing network security based on an identified adversary. In one embodiment, the process may include two stages. The first stage of the process may include detecting an adversary within network traffic data of a network. The second stage of the process may include searching for specific IOCs corresponding to a particular adversary that was identified during the first stage. Although the present disclosure depicts the process as a two-stage process, it is contemplated that the process may include additional or fewer stages, and that the particular number of stages is not a limiting aspect of the process disclosed herein.

In some embodiments, the process may include connecting to one or more different SIEM systems and/or knowledge bases to retrieve certain data and/or parameters. In some embodiments, the process connects to the SIEM systems via APIs. In some embodiments, the application connects to IBM® QRadar® via QRadar® Offense API and/or QRadar® Use-Case Manager API and/or to IBM® X-Force® Exchange via X-Force® Exchange API.

The illustrative embodiment includes a process for receiving network traffic data from a network and detecting behavior within the network traffic data that corresponds to potential malicious activity. Detecting behavior within the network traffic data may further include detecting tactics and techniques within the network traffic data. The illustrative embodiment may further include comparing the behavior that was detected against an adversary mapping that describes a relationship between certain behaviors and known adversaries that may be associated with said certain behaviors. Accordingly, the adversary mapping may include a list of behaviors and a list of adversaries, wherein each adversary may be associated with certain behaviors from the list of behaviors. When at least one behavior is detected in the network traffic data, the at least one behavior may be compared to the list of behaviors in the adversary mapping to determine and identify which adversary or adversaries from the list of adversaries may be associated with the behavior that was detected. Accordingly, the adversary mapping enables correlation between detected behaviors and known adversaries associated with the detected behaviors. Further, an adversary may be identified in the network traffic data by determining that all of the behaviors detected in the network traffic data correspond to a particular adversary.

In some embodiments, the adversary mapping is a threat group mapping that compares certain tactics and techniques with certain known threat groups. In some such embodiments, tactics and techniques that were detected are compared against the threat group mapping to determine and identify which threat group(s) may be associated with the tactics and techniques that were detected. Accordingly, the threat group mapping enables correlation between detected tactics and techniques and known threat groups associated with the detected tactics and techniques. Further, a threat group may be identified in the network traffic data by determining that all of the tactics and techniques detected in the network traffic data correspond to a particular threat group.

The illustrative embodiment contemplates, as a nonlimiting example, detecting behavior within network traffic data via a SIEM that may be configured to monitor network traffic data and detect behaviors within the network traffic data. As a nonlimiting example, IBM® QRadar® is a SIEM contemplated herein that may be configured to monitor network traffic data and detect behaviors in the network traffic data. Accordingly, a security alert e.g., offense may be received from QRadar® indicating that malicious behavior has been detected in the network traffic data. Security alert related data, e.g., offense details may be extracted from the security alert, wherein the security alert related data may include one or more rule IDs that may indicate certain conditions that were met to actuate the security alert. The certain conditions that were met to actuate the security alert may include tactics and techniques that were detected in the network traffic data. Accordingly, at least one rule ID may be extracted from offense details pertaining to at least one offense received from QRadar®, and the at least one rule ID may subsequently be utilized to retrieve tactics and techniques associated with the rule ID via the QRadar® Offense API. Further, each of a plurality of rule IDs extracted from the offense details may be used to request tactics and techniques to be returned for each rule ID. The tactics and techniques for each of the plurality of rule IDs may be combined to form a set of tactics and techniques. Further, a threat group mapping may be retrieved from QRadar® via the QRadar® Use-Case Manager API. Accordingly, in such embodiment, a threat group may be identified that corresponds to each tactic and technique of the plurality of tactics and techniques that were retrieved based on the offense received from QRadar®. In some embodiments, the tactics and techniques may be based on tactics and techniques of threat groups that are compiled and disclosed by the Mitre® ATT&CK® framework. Accordingly, the process may retrieve tactics and techniques for all the rules triggered in a given offense, and identify a common threat group for all the tactics and techniques. It is contemplated that more than one offense may be received. Accordingly, in a scenario where a plurality of offenses is received, a plurality of rule IDs may be retrieved from each of the plurality of offenses, and a plurality of tactics and techniques may be retrieved from each of the plurality of rule IDs. A common threat group for each of the plurality of tactics and techniques may then be identified.

The illustrative embodiment further includes performing a search over the network for Indicators of Compromise (IOCs) that correspond to the adversary that was identified based on the behavior that was detected within the network traffic data. In some embodiments, IOCs may be retrieved via a knowledge base that contains information relating to known adversaries and IOCs that are associated with said known adversaries. As a nonlimiting example, it is contemplated that X-Force® Exchange may be utilized to retrieve IOCs for particular threat groups via the X-Force® Exchange API. Accordingly, case files (know as "collections") may be retrieved from X-Force® Exchange, wherein each case file may include specific IOCs for a particular threat group.

In the illustrative embodiment, searching for IOCs may include constructing and entering a query that includes search terms that may be formed from specific IOCs that correspond to the adversary that was previously identified. Accordingly, each of the IOCs that correspond to the adversary that was identified may be used as criteria within the query to search for IOCs in network traffic data that match the specific IOCs for a particular threat group. The network traffic data that is searched may include, but is not limited to, flow and/or event data. IOC-based criteria may include, but is not limited to, source IP address, destination IP address, port, domain name, etc. Accordingly, specific IOCs may be used in part to form search criteria to construct a query to search flow data and event data. Accordingly, a query may be constructed to search for flows and/or events that match specific IOC-related attributes. In some embodiments, the query may include search terms that may be formed from specific IOCs that correspond to an adversary that was not previously identified. In some other embodiments, the query may include search terms that may be formed from any specific IOCs.

As a nonlimiting example, it is contemplated herein that events and/or flows within QRadar® may be searched to locate specific IOCs relating to each threat group that has been previously identified. In some embodiments, IOCs retrieved from X-Force® Exchange may be stored in an IOC reference set in QRadar®.

In some embodiments, network traffic data is searched for specific IOCs for a predetermined period of time. In some such embodiments, the predetermined period of time is 1 hour. In some other embodiments, the predetermined period of time is less than one hour. In some other embodiments, the predetermined period of time is greater than one hour. It is contemplated that network traffic data may be searched continuously for an indefinite period of time. In some embodiments, network traffic data is searched until an IOC is located.

In the illustrated embodiment, upon completing a search for specific IOCs, the count of events and flows matching IOCs, and event and flow details of the query results are displayed to a user via an interface. In some embodiments, additional responsive actions are automatically initiated upon locating an IOC within network traffic data. In some such embodiments, additional responsive actions may include, but are not limited to, isolating a segment of the network where the specific indicator of compromise was located, disconnecting a potentially compromised device, disabling a network port, blocking an IP address, resetting a password for a user account, removing malware, deleting a file, restoring a file, reimaging a device, sharing an incident report with a legal authority, and/or sharing an incident report with an intelligence sharing organization.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved network management module 200 that provides assessment of computer network security based on identification of an adversary. In addition to network management module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and network management module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in network management module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in network management module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, t and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
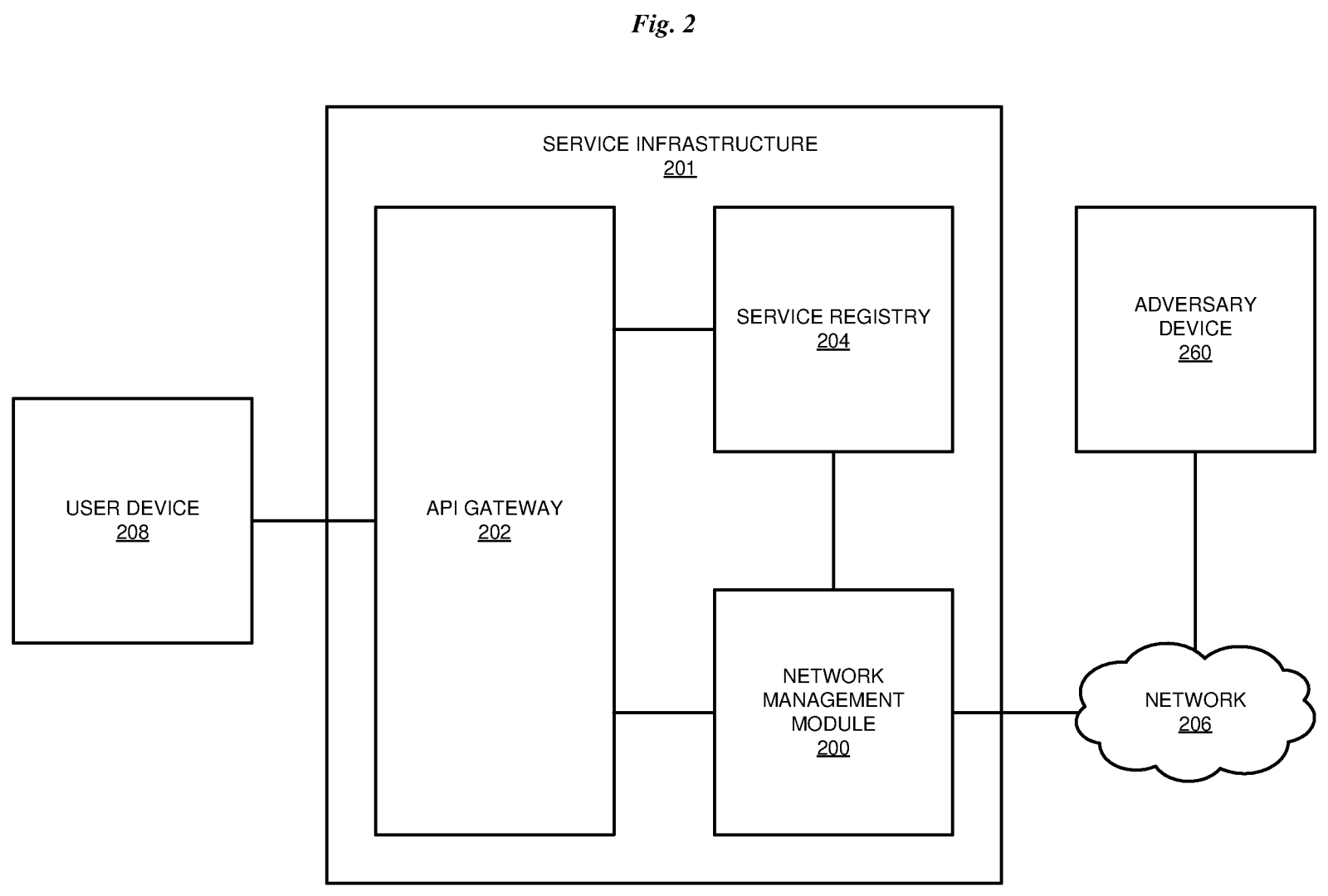

With reference to FIG. 2, this figure depicts a block diagram of an example service infrastructure 201 in accordance with an illustrative embodiment. In the illustrated embodiment, the network infrastructure 201 includes the network management module 200 of FIG. 1.

In the illustrated embodiment, the service infrastructure 201 provides services and service instances to a user device 208. User device 208 communicates with service infrastructure 201 via an API gateway 202. In various embodiments, service infrastructure 201 and its associated network management module 200 serve multiple users and multiple tenants. A tenant is a group of users (e.g., a company) who share a common access with specific privileges to the software instance. Service infrastructure 201 ensures that tenant specific data is isolated from other tenants.

In the illustrated embodiment, service infrastructure 201 includes a service registry 204. In some embodiments, the network management module 200 is hosted on a virtual machine and the service registry 204 looks up service instances for network management module 200 in response to a service lookup request such as one from API gateway 202 in response to a service request from user device 208. For example, in some embodiments, the service registry 204 looks up service instances of network management module 200 in response to requests related to incident resolution from the user device 208.

As described herein, the network management module 200 may provide a network security assessment system that manifests in the form of an Internet website or a mobile application that is accessible by user device 208. A backend administration system (not shown) allows users with administrative privileges to perform various administrative tasks associated with the network management module 200 as described herein, such as initiating a data collection and/or correlation process or a neural network training process.

In some embodiments, service registry 204 maintains information about the status or health of each service instance including performance information associated with each of the service instances. In some such embodiments, such information may include various types of performance characteristics of a given service instance (e.g., cache metrics, etc.) and records of updates.

In some embodiments, user device 208 connects with API gateway 202 via any suitable network or combination of networks such as the Internet, etc. and uses any suitable communication protocols such as Wi-Fi, Bluetooth, etc. Service infrastructure 201 may be built on the basis of cloud computing. API gateway 202 provides access to client applications like the network management module 200. API gateway 202 receives service requests issued by client applications and creates service lookup requests based on service requests. As a non-limiting example, in an embodiment, the user device 208 executes a routine to initiate interaction with the network management module 200. For instance, in some embodiments, the user device 208 executes a routine to instruct the network management module 200 to monitor network 206 according to embodiments described herein.

In some embodiments, adversary device 260 includes any device utilized by an adversary attempting to access network 206. Any actions performed by adversary device 260 may be recorded by network management module 200.

Figure 3:
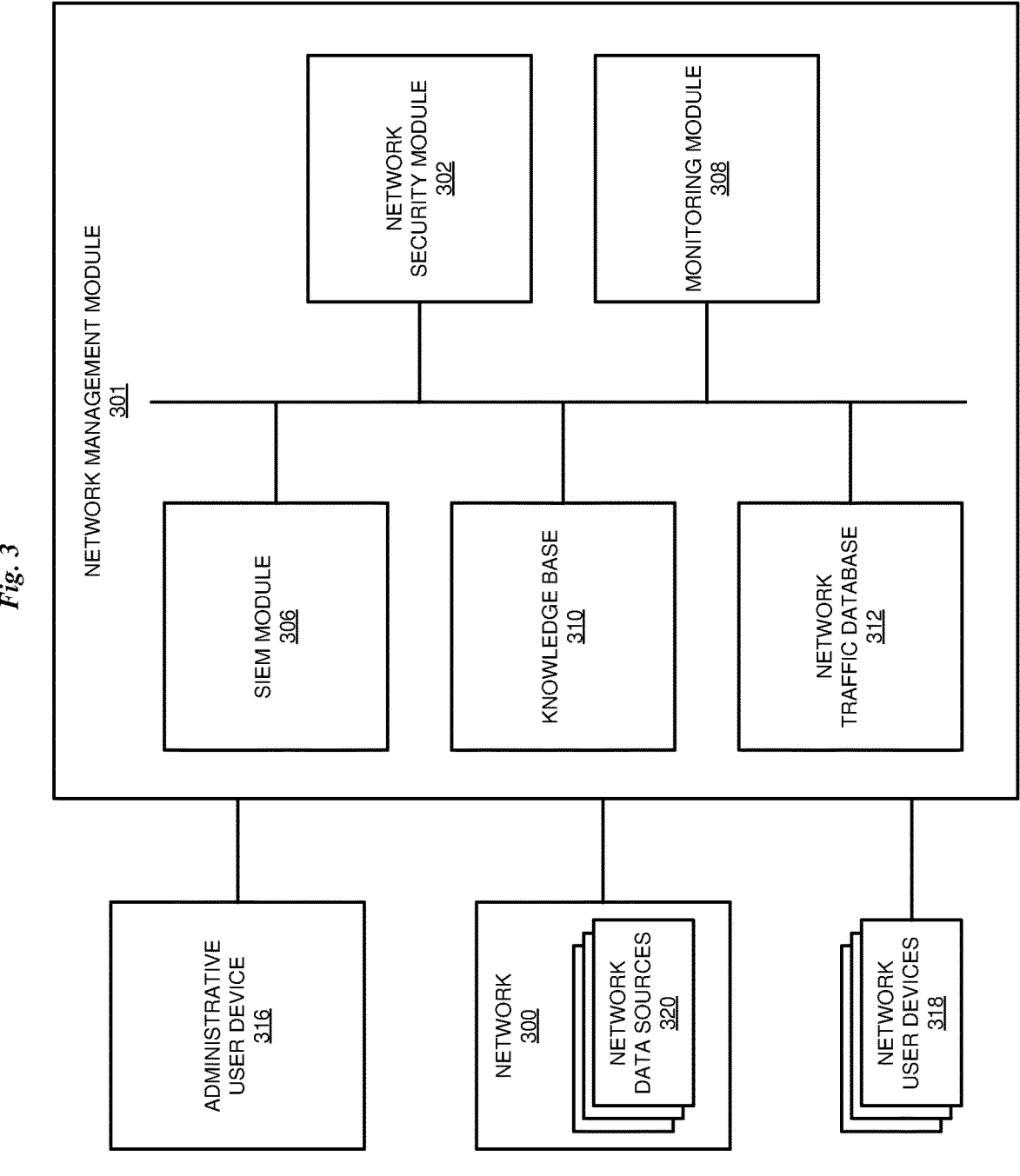
FIG. 3 depicts a block diagram of an example security module in accordance with an illustrative embodiment.

With reference to FIG. 3, this figure depicts a block diagram of an example network management module 301 in accordance with an illustrative embodiment. In the illustrated embodiment, the network management module 301 is an example of the network management module 200 of FIGS. 1 and 2.

In the illustrated embodiment, the network management module 301 includes a network security module 302, a System Information and Event Management (SIEM) module 306, a monitoring module 308, a knowledge base 310, and a network traffic database 312. In alternative embodiments, the network management module 301 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, an administrative user device 316 allows users with administrative privileges to perform various administrative tasks associated with the network management module 301 as described herein. For example, in some embodiments, the administrative user device 316 allows an administrative user to initiate a data collection process or network monitoring process.

In the illustrated embodiment, the network management module 301 is also in communication with a network 300. Network 300 is an exemplary embodiment of network 206 shown in FIG. 2. Network 300 includes a plurality of network data sources 320. The network data sources 320 can include any known types of network monitoring systems or sensors that generate network monitoring data. The exact devices used to generate network monitoring data may be implementation-specific and dependent upon the type of network. The network management Module 301 is also in communication with a plurality of network user devices 318, which may be any type of computing devices.

In some embodiments, the network management module 301 receives network data from the network data sources 320 and evaluates the received network data for potential adversarial behavior. In some embodiments, the network data includes network traffic data. In some such embodiments, the network traffic data includes all data related to activity on the network 300, including but not limited to, log data, event data, flow data, etc. In the illustrated embodiment, the network traffic data is stored on a network traffic database 312.

In some embodiments, the network traffic data is evaluated by the network security module 302. In some embodiments, the network traffic data is evaluated by a separate monitoring module 308. In some embodiments, the network traffic data is evaluated by a separate SIEM module 306. In some embodiments, the network traffic data is evaluated by a combination of network security module 302, SIEM module 306, and monitoring module 308.

In some embodiments, network management module 301 is configured to establish a network traffic database 312 based at least in part on network traffic data received from network 300. The network traffic database 312 includes network traffic data from network data sources 320 representative of a plurality of entities in the network 300 and relationships among the plurality of entities in the network 300. Further, network management module 301 is configured to detect adversarial behavior within the network traffic data, via either SIEM module 306, network security module 302, monitoring module 308, or any combination thereof. Further, network management module 301 is configured to identify an adversary associated with the adversarial behavior that has been detected, via either SIEM module 306, network security module 302, monitoring module 308, or any combination thereof. Further, network management module 301 is configured to determine a plurality of specific Indicators of Compromise (IOCs) that are associated with the adversary that has been identified via either SIEM module 306, network security module 302, monitoring module 308, or any combination thereof. Further, network management module 301 is configured to construct a query based on the plurality of specific IOCs via either SIEM module 306, network security module 302, monitoring module 308, or any combination thereof. Further, network management module 301 is configured to submit the query to search for the plurality of specific IOCs within the network traffic data that may be stored on network traffic database 312 via either SIEM module 306, network security module 302, monitoring module 308, or any combination thereof. Further, the query then may be submitted to search for the plurality of specific IOCs within the network traffic data via either SIEM module 306, network security module 302, monitoring module 308, or any combination thereof. Further, network management module 301 is configured to generate, responsive to having located at least one potential IOC, a search report containing the at least one specific IOC and displaying the search report to a user interface via either SIEM module 306, network security module 302, monitoring module 308, or any combination thereof. In some embodiments, the search report is sent to administrative user device 316. In some other embodiments, the search report is sent a user device of network user devices 318.

In some embodiments, SIEM module 306 is configured to collect, correlate, and analyze event and flow data from network data sources 320 to identify security incidents, detect patterns, and/or generate responses. In a particular embodiment, the SIEM module includes QRadar®. In some embodiments, SIEM module 306 detects adversarial behavior within the network traffic data. In some such embodiments, the SIEM module detects tactics and techniques of potential adversaries within the network. In some embodiments, upon detection of adversarial behavior, SIEM module 306 generates an alert and sends the alert to the network security module 302. In some embodiments, the alert is a QRadar® offense.

In some embodiments, the network security module 302, upon receiving an alert, determines the cause of the alert. In a particular embodiment, the network security module 302 communicates to the SIEM module 306 to determine the conditions that were met in order for the SIEM module 306 to produce the alert. In a particular embodiment, where the SIEM module 306 is QRadar®, network security module 302 communicates with SIEM module 306 to retrieve a rule ID based on an offense that was generated in response to triggering a rule or rules. Further, in said embodiment, upon retrieving the rule ID, network security module 302 extracts tactics and techniques for each rule that was triggered. Further, in said embodiment, network security module 302 compiles a set of tactics and techniques containing all of the tactics and techniques that were extracted for each rule that was triggered. Further, in said embodiment, network security module 302 correlates the set of tactics and techniques with known adversaries to identify an adversary.

In some embodiments, the knowledge base 310 receives and stores data representative of known adversaries. In some embodiments, such data includes, but is not limited to, data related to adversaries, such as collections and case files related to adversaries, wherein such collections and case files may include Indicators of Compromise associated with adversaries. In some embodiments, network security module 302 includes its own integrated knowledge base which includes data related to adversaries, adversarial behavior, tactics, techniques, and procedures, as well as Indicators of Compromise associated with adversaries. In some embodiments, the knowledge base 310 receives data from X-Force® Exchange.

In some embodiments, the monitoring module 308 detects potential adversarial behavior, and notifies the SIEM module 306 upon detection of potential adversarial behavior. In some such embodiments, SIEM module 306 then evaluates the potential adversarial behavior to determine whether any set of conditions have been met to actuate an alert. In some embodiments, network security module 302 may perform all or some of the functions of SIEM system module 306 and/or monitoring module 308.

Figure 3A:
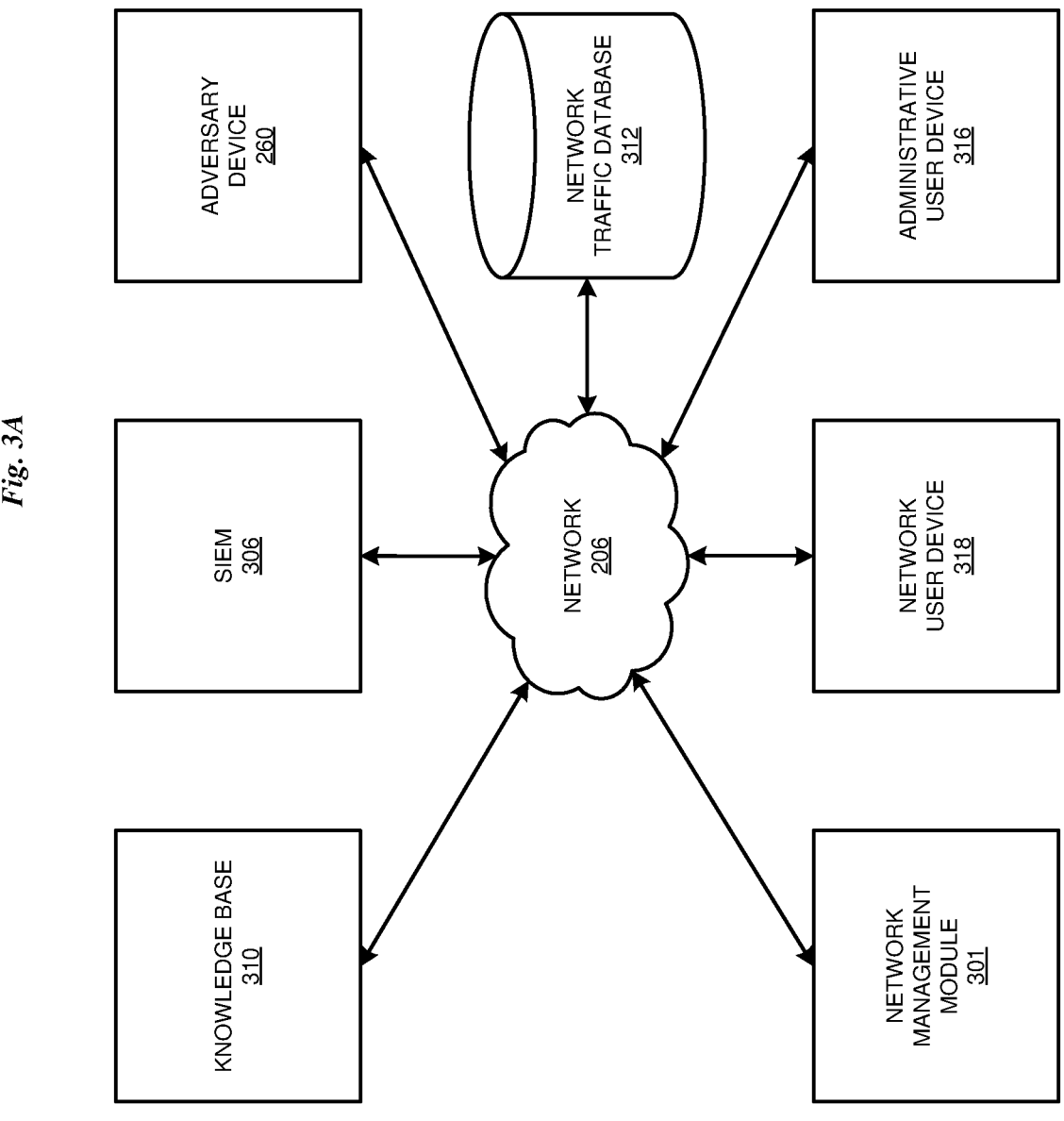
FIG. 3A depicts a block diagram of an example network environment in accordance with an illustrative embodiment.

With reference to FIG. 3A, this figure depicts a block diagram of an example network environment including network management module 301. In the illustrated embodiment, FIG. 3A depicts a network environment including a network 206, a network management module 301, a SIEM module 306, a knowledge base 310, a network traffic database 312, an administrative user device 316, a network user device 318, and an adversary device 260. With reference to FIG. 3A, network management module 301 is shown connected to SIEM module 306 and knowledge base 310 via network 206. Further, network management module 301 is shown connected to network traffic database 312 via network 206. In accordance with the embodiment illustrated by FIG. 3A, network management module 301 may be configured to receive network traffic data from network traffic database 312. Network traffic database 312 may store all network data related to any actions taking across network 206, as described herein. Further, network traffic database 312 may include, but is not limited to, network traffic data in the form of event data and/or flow data, as described herein.

With continued reference to FIG. 3A, adversary device 260 is shown in communication with network 206. Adversary device 260 may be any device that may be used by a potential adversary attempting to compromise the network security of network 206. It is contemplated herein that any actions taken by adversary device 260 may be stored in the network traffic database 312.

With continued reference to FIG. 3A, network management module 301 may be configured to receive network traffic data from network traffic database 312, and detect potential adversarial behavior within the network traffic data received from network traffic database 312. Further, network management module 301 may construct a list of potential adversarial behavior detected within the network traffic data, and subsequently compare the list of potential adversarial behavior detected with an adversary mapping to identify an adversary, as described herein. Further, network management module 301 may be configured to determine IOCs associated with the adversary that has been identified, as described herein. Further, network management module 301 may be configured to construct a query to search for evidence of a potential malicious activity within network traffic database 312, to determine whether any malicious activity has taken place across network 206. Accordingly, the query of search terms may include a search term formed from an IOC that is associated with the adversary that was previously identified. Further, upon locating evidence of a potential malicious activity, network management module 301 may generate a search report to provide and display over an interface on network user device 318 and/or administrative user device 316. It is contemplated herein that network management module 301 may send the search report to other devices that might not be shown in the FIG. 3A.

Further, it is contemplated herein that network management module 301 may be configured to automatically initiate other responsive actions. For example, network management module 301 may be configured to isolate a segment of network 206 where evidence of potential compromise was located, disconnect a potentially compromised device, disable a network port, block an IP address, reset a password for a user account, remove malware, delete a file, restore a file, reimage a device, share an incident report with a legal authority, and/or share an incident report with an intelligence sharing organization.

Further, in one embodiment, SIEM module 306 may be configured to detect, monitor, and analyze network traffic data stored on network traffic database 312, as described herein. Accordingly, in said embodiment, SIEM module 306 may receive potential adversarial behavior within network traffic data received from network traffic database 312, and subsequently SIEM module 306 may communicate a listing of potential adversarial behavior to network management module 301. In said embodiment, upon receiving a listing of the potential adversarial behavior from SIEM module 306, network management module 301 may identify an adversary based on the listing of potential adversarial behavior received from SIEM module 306, and perform a network security assessment of network 206, as described herein.

Further, in one embodiment, knowledge base 310 may be configured to store information related to known adversaries, as described herein. Accordingly, in said embodiment, when a known adversary has been identified by network management module 301, network management module 301 may request information relating to the known adversary from knowledge base 310, wherein the information may include IOCs associated with the known adversary that was identified. Further, network management module 301 may construct a query to search for IOCs across network 206, wherein the query may include search terms formed in part from IOCs associated with the previously identified adversary, said IOCs provided by knowledge base 310.

With reference to FIG. 4, this figure depicts a flowchart of an example process 400 for network security assessment based upon identification of an adversary. In a particular embodiment, the network management module 200 of FIGS. 1 and 2 carries out the process 400.

In the illustrated embodiment, at block 402, the process receives network data from a network. At block 404, the process detects adversarial behavior existing within the network data. In some embodiments, the adversarial behavior may include any behavior that may be associated with potential malicious activity suspected over a network. In some embodiments, the adversarial behavior may include tactics, techniques, and/or procedures, as defined herein.

At block 406, the process identifies an adversary based on the adversarial behavior detected during block 404. In a particular embodiment, the process compares the tactics and techniques that have been detected during 404 against a mapping defining threat groups with particular tactics and techniques, to find a threat group that is associated with all of the tactics and techniques that have detected. For example, Threat Group A may be associated with a first set of tactics and techniques, Threat Group B may be associated with a second set of tactics and techniques, while Threat Group C may be associated with a combined third set of tactics and techniques that comprises all of the tactics and techniques from the first set of tactics and techniques and the second set of tactics and techniques. In a scenario where only the first set of tactics and techniques were detected, Threat Group A may be detected during block 406. In a scenario where only the second set of tactics and techniques were detected, Threat Group B may be detected during block 406. In a scenario where all of the tactics and techniques of the first set of tactics and techniques and the second set of tactics and techniques were detected, then Threat Group C may be identified.

At block 408, the process determines a plurality of specific Indicators of Compromise (IOCs) that are associated with the adversary that was identified during block 406. At block 410, the process constructs a query that may include in part search terms formed from the plurality of specific IOCs that were determined during block 408. Accordingly, specific IOCS that are associated with the adversary that was previously identified may be used in part to form the criteria for the query. In a particular embodiment, the query is an AQL query. In some other embodiments, the query is written in a different query language. It is contemplated that any suitable query language and any suitable database may be utilized to accomplish the process disclosed herein.

At block 412, the process enters the query to search for and locate any of said specific IOCs that may exist within the computer network. At block 414, upon having located one or more IOCs, the process generates a search report that includes the IOCs that have been located. Also, at block 414, the search report is displayed on an interface of a user device.

Process 400 may include performing additional actions not illustrated by the flowchart depicted in FIG. 4. In some implementations, procedure 400 also includes automatically initiating a responsive action upon locating a potential IOC. In some embodiments, initiating a responsive action may include, but is not limited to, isolating segment of the network where the specific IOC was located, disconnecting a potentially compromised device, disabling a network port, blocking an IP address, resetting a password for a user account, removing malware, deleting a file, restoring a file, reimaging a device, sharing an incident report with a legal authority, and/or sharing an incident report with an intelligence sharing organization.

Figure 5:
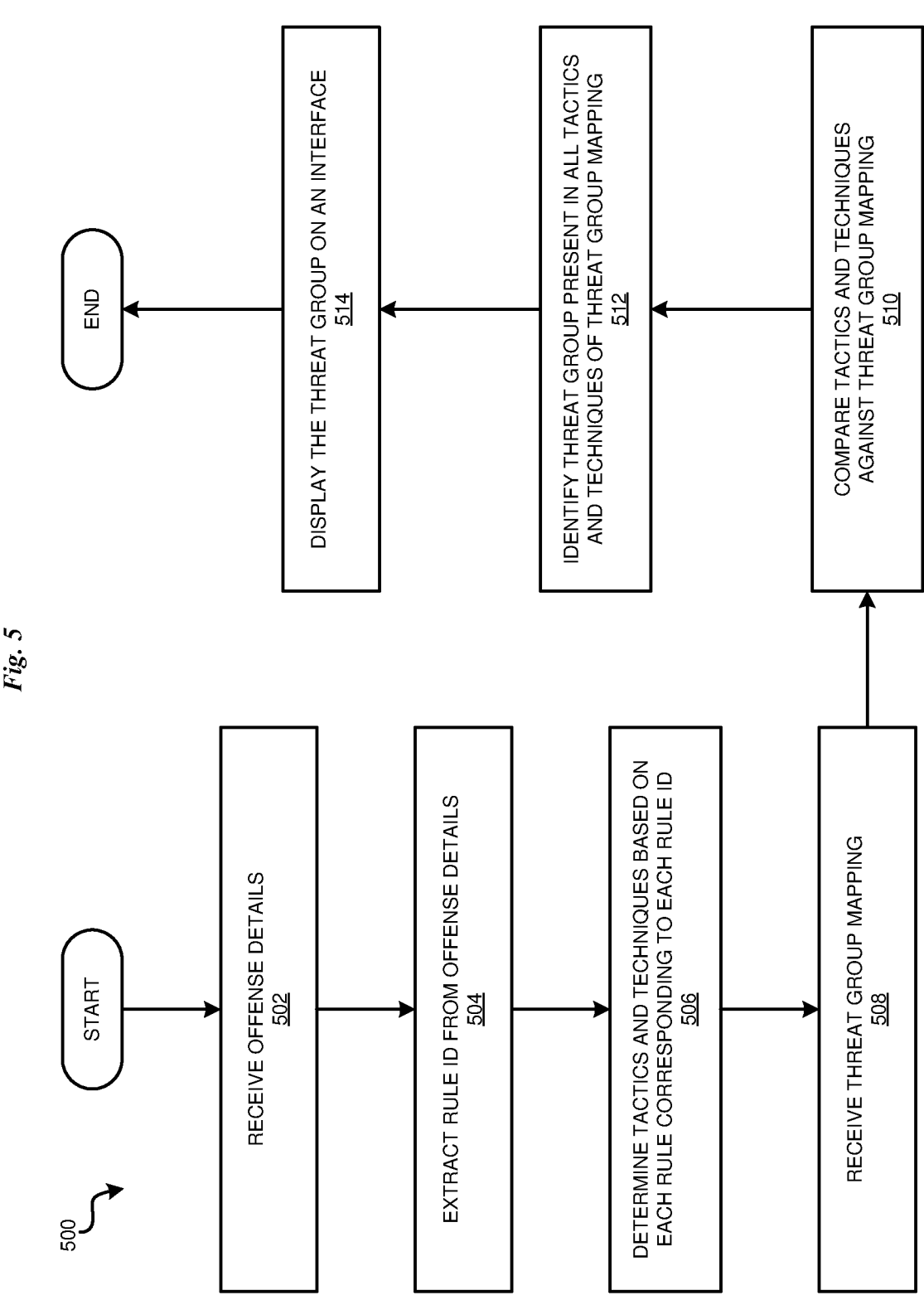
FIG. 5 depicts a flowchart of an example process for identification of an adversary.
Figure 6:
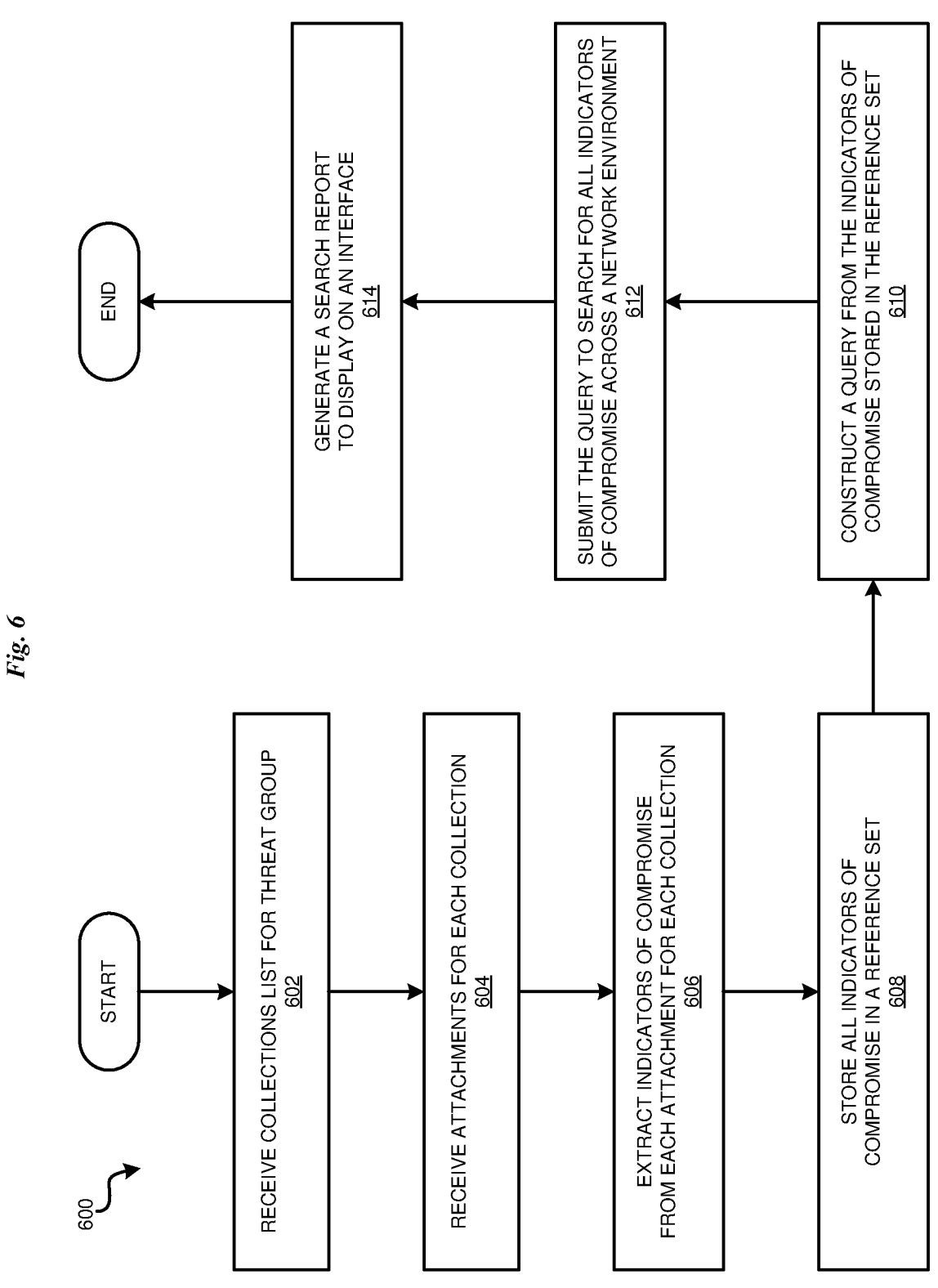
FIG. 6 depicts a flowchart of an example process for network security assessment based upon identification of an adversary.

With reference to FIGS. 5 and 6, the figures depict flowcharts of a particular embodiment of the process disclosed herein that may be implemented at least in part with QRadar® and X-Force®. FIG. 5 depicts an exemplary process 500 of identifying a threat group, in accordance with some embodiments. FIG. 6 depicts an example process 600 of performing a network security assessment by searching for IOCs associated with the threat group identified during process 500.

With reference to FIG. 5, the figure depicts an example process 500 of identifying at least one threat group. In the illustrated embodiment, at block 502, the process receives offense details. In one embodiment, offense details are received from QRadar® API.

At block 504, the process extracts at least one rule ID from the offense details retrieved. The rule ID includes a set of conditions that when met caused the offense to be generated, from which the offense details were retrieved. It is contemplated that in some scenarios, offense details may include a plurality rule IDs. In such scenarios, the process may extract each of the plurality of rule IDs from the offense details.

At block 506, the process determines at least one adversarial behavior based on the rule IDs that were extracted during step 504. In some embodiments, the at least one adversarial behavior includes a plurality of tactics and techniques. It is contemplated that blocks 504-506 may be repeated until each of the plurality of tactics and techniques is retrieved. The plurality of tactics and techniques may form a set of all tactics and techniques determined based on all rule IDs that were extracted.

At block 508, the process receives a threat group mapping. The threat group mapping may include a mapping of all tactics and techniques mapped with associated threat groups. At block 510, the process compares the set of all tactics and techniques determined during block 506 to the threat group mapping retrieved during block 508.

At block 512, the process identifies a threat group. In some embodiments, the threat group that is identified is a threat group from the threat group mapping that matches each of the tactics and techniques of all of set of tactics and techniques determined during step 506.

At block 514, the process finishes by displaying the identified threat group on a user interface.

With reference to FIG. 6, this figure depicts a flowchart of an example process 600 for searching for indicators of compromise. In the illustrated embodiment, at block 602, the process receives a collections list for at least one threat group. In some embodiments, the at least one threat group includes the threat group identified during process 500. In some embodiments, the collections list for the threat group is retrieved from X-Force® Exchange.

At block 604, the process receives attachments for each collection that was retrieved during block 602. At block 606, the process extracts Indicators of Compromise from each attachment of collection. At block 608, the process stores all Indicators of Compromise in a reference set. In some embodiments, the reference set is stored in QRadar®.

At block 610, the process constructs a query that may include terms that are formed from the Indicators of Compromise stored in the reference set. At block 612, the process submits the query to search for all Indicators of Compromise across a network environment. Finally, at block 614, the process generates a search report containing any Indicators of Compromise that were located to display on an interface.

Process 600 may include performing additional actions not illustrated by the flowchart depicted in FIG. 6. In some implementations, process 600 also includes automatically initiating a responsive action upon locating a potential IOC. In some embodiments, initiating a responsive action may include, is not limited to, isolating a segment of the network where the specific indicator of compromise was located, disconnecting a potentially compromised device, disabling a network port, blocking an IP address, resetting a password for a user account, removing malware, deleting a file, restoring a file, reimaging a device, sharing an incident report with a legal authority, and/or sharing an incident report with an intelligence sharing organization.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

establishing a database based at least in part on network traffic data received from a network, wherein the database comprises network traffic data representative of a plurality of entities in the network and relationships among the plurality of entities in the network;

detecting adversarial behavior within the network traffic data;

identifying at least one adversary associated with the adversarial behavior, wherein the identifying comprises extracting a plurality of rule identifiers (rule IDs) corresponding to a plurality of rules triggered by the detecting, each rule ID in the plurality of rule IDs corresponding to a plurality of tactics, each tactic being associated with a corresponding threat group; and selecting, responsive to a particular threat group being common to each rule ID in the plurality of rule ID, the particular threat group as the at least one adversary;

determining a plurality of specific indicators of compromise that are associated with the at least one adversary that has been identified;

constructing a query based on the plurality of specific indicators of compromise, wherein the query includes a criterion enabling searching for an indicator corresponding to a particular threat group;

submitting the query to search for the plurality of specific indicators of compromise within the network traffic data;

searching for the plurality of specific indicators of compromise within the network traffic data; and generating, responsive to having located at least one potential indicator of compromise, a search report containing at least one specific indicator of compromise and displaying the search report to a user interface.

2. The computer-implemented method of claim 1, wherein identifying the at least one adversary comprises comparing the adversarial behavior that has been detected to a mapping of known adversaries and tactics and techniques associated with the known adversaries.

3. The computer-implemented method of claim 1, wherein the method further comprises initiating a response action upon having located the at least one indicator of compromise.

4. The computer-implemented method of claim 3, wherein the initiating a response action comprises at least one of isolating a segment of the network, resetting a password for user an account, removing malware, and blocking an IP address.

5. The computer-implemented method of claim 1, wherein the searching for the plurality of indicators of compromise is performed for a predetermined period of time.

6. The computer-implemented method of claim 5, wherein the predetermined period of time is one hour.

7. The computer implemented method of claim 1, wherein the method is performed iteratively once every predefined period of time.

8. The computer implemented method of claim 1, wherein the method is performed upon receiving an alert that a set of conditions indicative of potential adversarial behavior have been met.

9. The computer-implemented method of claim 1, wherein the method further includes, upon submitting the query, parsing and optimizing the query prior to searching for the plurality of specific indicators of compromise.

10. A computer program product comprising one or more computer readable storage media, and program instructions collectively stored on the one or more computer readable storage media, the program instructions executable by a processor to cause the processor to perform operations comprising:

establishing a database based at least in part on network traffic data received from a network, wherein the database comprises network traffic data representative of a plurality of entities in the network and relationships among the plurality of entities in the network;

detecting adversarial behavior within the network traffic data;

identifying at least one adversary associated with the adversarial behavior, wherein the identifying comprises extracting a plurality of rule identifiers (rule IDs) corresponding to a plurality of rules triggered by the detecting, each rule ID in the plurality of rule IDs corresponding to a plurality of tactics, each tactic being associated with a corresponding threat group; and selecting, responsive to a particular threat group being common to each rule ID in the plurality of rule ID, the particular threat group as the at least one adversary;

determining a plurality of specific indicators of compromise that are associated with the at least one adversary that has been identified;

constructing a query based on the plurality of specific indicators of compromise, wherein the query includes a criterion enabling searching for an indicator corresponding to a particular threat group;

submitting the query to search for the plurality of specific indicators of compromise within the network traffic data;

searching for the plurality of specific indicators of compromise within the network traffic data; and generating, responsive to having located at least one potential indicator of compromise, a search report containing at least one specific indicator of compromise and displaying the search report to a user interface.

11. The computer program product of claim 10, wherein the stored program instructions are stored in a computer readable storage device in a data processing system, and wherein the stored program instructions are transferred over the network from a remote data processing system.

12. The computer program product of claim 10, wherein identifying the at least one adversary comprises comparing the adversarial behavior that has been detected to a mapping of known adversaries and tactics and techniques associated with the known adversaries.

13. The computer program product of claim 10, further comprising initiating a response action upon having located the at least one indicator of compromise.

14. The computer program product of claim 10, wherein the initiating a response action comprises at least one of isolating a segment of the network where the specific indicator of compromise was located, resetting a password for user accounts, removing malware, and blocking an IP address.

15. The computer program product of claim 10, wherein the searching for the plurality of indicators of compromise is performed for a predetermined period of time.

16. The computer program product of claim 10, wherein the identifying is performed upon receiving an alert that a set of conditions indicative of potential adversarial behavior have been met.

17. A computer system comprising a processor and one or more computer readable storage media, and program instructions collectively stored on the one or more computer readable storage media, the program instructions executable by the processor to cause the processor to perform operations comprising:

establishing a database based at least in part on network traffic data received from a network, wherein database base comprises network traffic data representative of a plurality of entities in the network and relationships among the plurality of entities in the network;

detecting adversarial behavior within the network traffic data;

identifying at least one adversary associated with the adversarial behavior, wherein the identifying comprises extracting a plurality of rule identifiers (rule IDs) corresponding to a plurality of rules triggered by the detecting, each rule ID in the plurality of rule IDs corresponding to a plurality of tactics, each tactic being associated with a corresponding threat group; and selecting, responsive to a particular threat group being common to each rule ID in the plurality of rule ID, the particular threat group as the at least one adversary;

determining a plurality of specific indicators of compromise that are associated with the at least one adversary that has been identified;

constructing a query based on the plurality of specific indicators of compromise, wherein the query includes a criterion enabling searching for an indicator corresponding to a particular threat group;

submitting the query to search for the plurality of specific indicators of compromise within the network traffic data;

searching for the plurality of specific indicators of compromise within the network traffic data; and generating, responsive to having located at least one potential indicator of compromise, a search report containing at least one specific indicator of compromise and displaying the search report to a user interface.

18. The computer system of claim 17, wherein identifying the at least one adversary comprises comparing the adversarial behavior that has been detected to a mapping of known adversaries and tactics and techniques associated with the known adversaries.

19. The computer system of claim 17, wherein the operations are performed upon receiving an alert that a set of conditions indicative of potential adversarial behavior have been met.

20. The computer system of claim 17, further comprises initiating a response action upon having located at least one indicator of compromise.

* * * * *